US012664726B2

(12) United States Patent     (10) Patent No.:   US 12,664,726 B2
Durand et al.     (45) Date of Patent:    Jun. 23, 2026

(54) MACHINE-LEARNING FUNCTION FOR OUTPUTTING CAMERA VIEWPOINTS

(71) Applicant: DASSAULT SYSTEMES, Velizy Villacoublay (FR)

(72) Inventors: Tom Durand, Vélizy-Villacoublay (FR); Iheb Ben Salem, Vélizy-Villacoublay (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 123 days.

(21) Appl. No.: 18/806,248

(22) Filed: Aug. 15, 2024

(65) Prior Publication Data

US 2025/0061654 A1     Feb. 20, 2025

(30) Foreign Application Priority Data

Aug. 16, 2023    (EP) ..................................... 23306383

(51) Int. Cl.
*G06T 17/00*     (2006.01)
*G06T 7/60*     (2017.01)
*G06V 10/25*     (2022.01)

(52) U.S. Cl.
CPC ................ *G06T 17/00* (2013.01); *G06T 7/60* (2013.01); *G06V 10/25* (2022.01)

(58) Field of Classification Search
None
See application file for complete search history.

(56) References Cited

U.S. PATENT DOCUMENTS

| | | | |
|---|---|---|---|
| 12,394,135 B2 * | 8/2025 | Kowalski | .............. G06T 15/205 |
| 12,521,187 B2 * | 1/2026 | Bono | ..................... A61B 34/20 |
| 2023/0388470 A1 * | 11/2023 | Aluru | ................... G06V 10/761 |

OTHER PUBLICATIONS

Genova et al. Learning Where to Look: Data-Driven Viewpoint Set Selection for 3D Scenes. Princeton University, Apr. 2017. Submitted by applicant on Aug. 15, 2024. (Year: 2017).*
Schelling, M. et al., May 2021, "Enabling Viewpoint Learning through Dynamic Label Generation", In Computer Graphics Forum, vol. 40, No. 2, pp. 413-423. (11 pages).
(Continued)

*Primary Examiner* — Jamie R Kucab
(74) *Attorney, Agent, or Firm* — Oblon, McClelland, Maier & Neustadt, L.L.P.

(57)       ABSTRACT

A computer-implemented method for determining a machine-learning function configured for taking an input 3D scene and for outputting one or more camera viewpoints each for generating a respective 2D rendering of the 3D scene. The method includes obtaining a library having 3D scenes. The method includes, based on the library, forming a first dataset for training a first neural network configured for outputting a camera position and forming a second dataset for training a second neural network configured for outputting a camera orientation. The method includes training the first neural network based on the first dataset and training the second neural network based on the second dataset. Each camera viewpoint outputted by the machine-learning function includes a camera position and a camera orientation. Such a method forms an improved solution for outputting one or more camera viewpoints of a 3D scene.

19 Claims, 12 Drawing Sheets

(56) References Cited

OTHER PUBLICATIONS

Talebi, H. et al., 2018, "NIMA: Neural image assessment", IEEE transactions on image processing, 27(8), pp. 1-13. (13 pages).

Li, Y. et al., 2018, "Pointonn: Convolution on x-transformed points", Advances in neural information processing systems, 31, pp. 1-11 and 1-3. (14 pages).

Wang, K. et al., 2019, "Planit: Planning and instantiating indoor scenes with relation graph and spatial prior networks", ACM Transactions on Graphics (TOG), vol. 38, No. 4, Article 132, pp. 1-15. (15 pages).

Corso, G. et al., 2020, "Principal neighbourhood aggregation for graph nets", Advances in Neural Information Processing Systems, 33, pp. 1-19. (19 pages).

"Source code for torch.nn.modules.transformer", retrieved on Aug. 14, 2024, torch.nn.modules.transformer—PyTorch 2.4 documentation, pp. 1-11. (11 pages) https://pytorch.org/docs/stable/_modules/torch/nn/modules/transformer.html#Transformer.

Paschalidou, D. et al., 2021, "Atiss: Autoregressive transformers for indoor scene synthesis", Advances in Neural Information Processing Systems, 34, pp. 1-14. (14 pages).

Vaswani, A., et al., "Attention is all you need", Advances in neural information processing systems, 2017, 30, pp. 1-15. (15 pages).

Hartwig, S. et al., Sep. 2022, "Learning Human Viewpoint Preferences from Sparsely Annotated Models", In Computer Graphics Forum, vol. 41, No. 6, pp. 453-466. (14 pages).

Genova, K. et al., 2017, "Learning where to look: Data-driven viewpoint set selection for 3d scenes", arXiv preprint arXiv:1704. 02393, pp. 1-15. (15 pages).

Roberts, M. et al., 2021, "Hypersim: a photorealistic synthetic dataset for holistic indoor scene understanding", In Proceedings of the IEEE/CVF international conference on computer vision (page range not indicated). (11 pages).

Zhang, Y. et al., (2017), "Physically-based rendering for indoor scene understanding using convolutional neural networks", In Proceedings of the IEEE conference on computer vision and pattern recognition (page range not indicated). (9 pages).

Extended European Search Report dated Mar. 15, 2024, issued in counterpart EP Application No. 23306383.3. (7 pages).

Zhang,Y et al., "3D Viewpoint Estimation Based on Aesthetics", IEEE Access, IEEE, USA, vol. 8, Jun. 8, 2020 (Jun. 8, 2020), pp. 108602-108621. (20 pages).

* cited by examiner

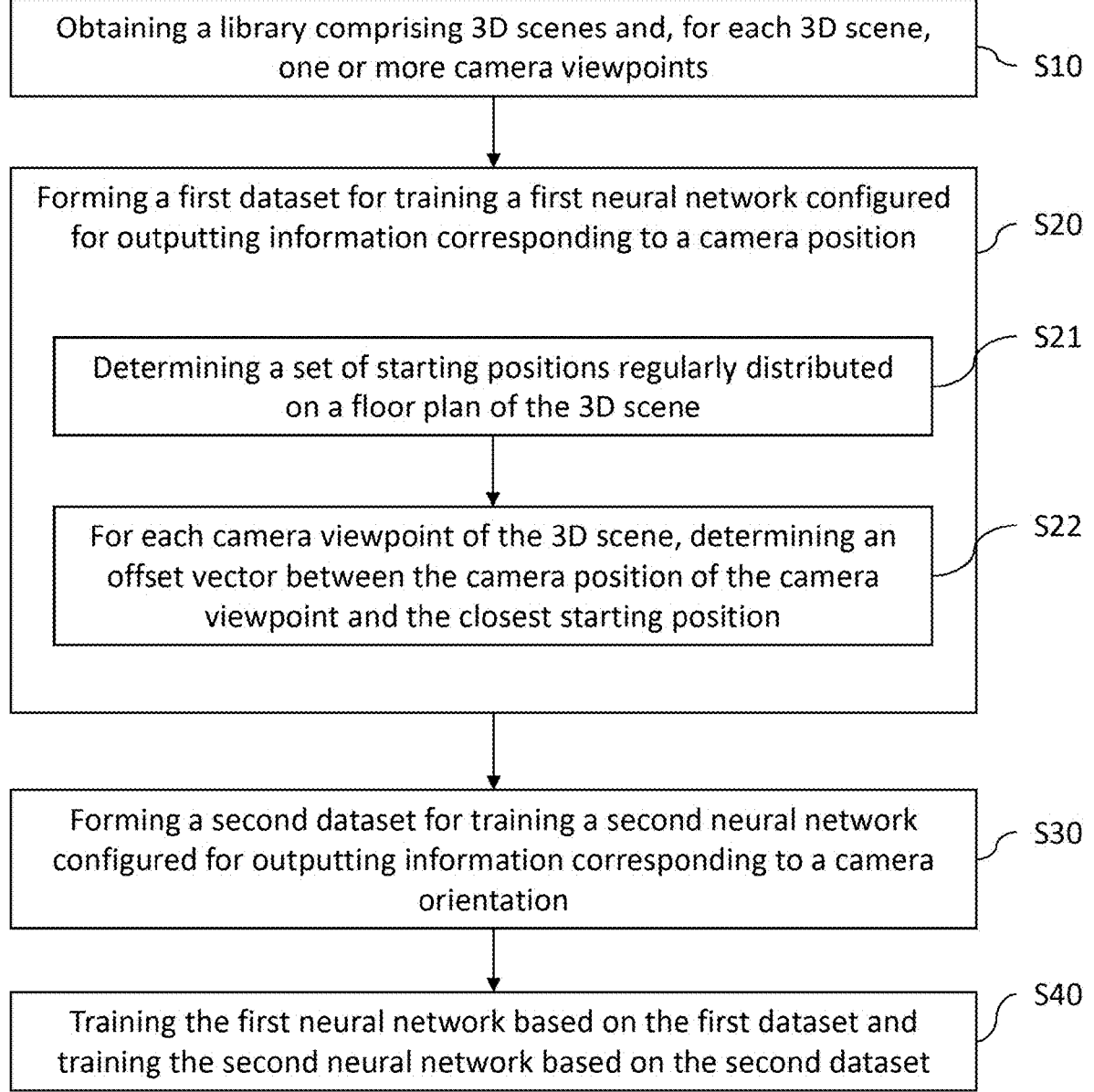

Obtaining a library comprising 3D scenes and, for each 3D scene, one or more camera viewpoints ⌐ S10

Forming a first dataset for training a first neural network configured for outputting information corresponding to a camera position ⌐ S20

Determining a set of starting positions regularly distributed on a floor plan of the 3D scene ⌐ S21

For each camera viewpoint of the 3D scene, determining an offset vector between the camera position of the camera viewpoint and the closest starting position ⌐ S22

Forming a second dataset for training a second neural network configured for outputting information corresponding to a camera orientation ⌐ S30

Training the first neural network based on the first dataset and training the second neural network based on the second dataset ⌐ S40

FIG. 1

FIG. 5

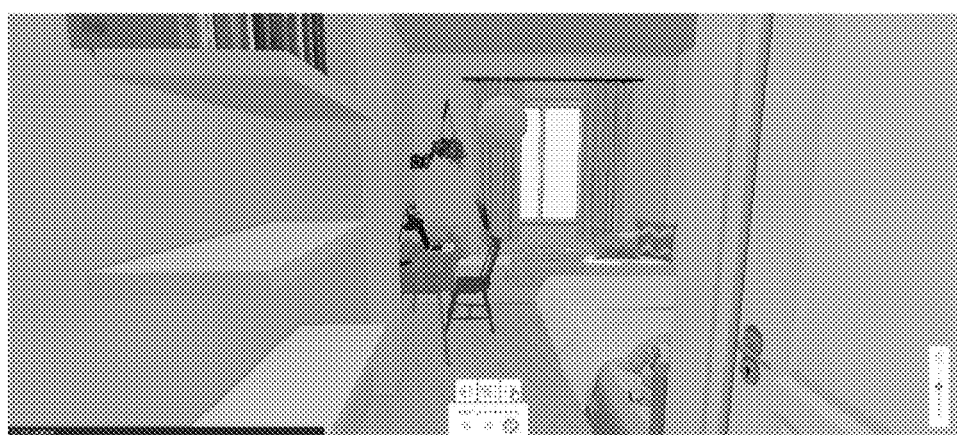
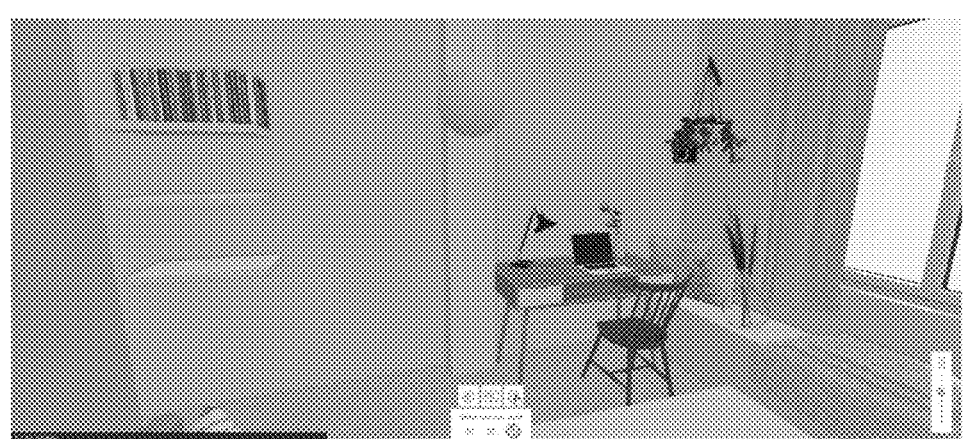
FIG. 7

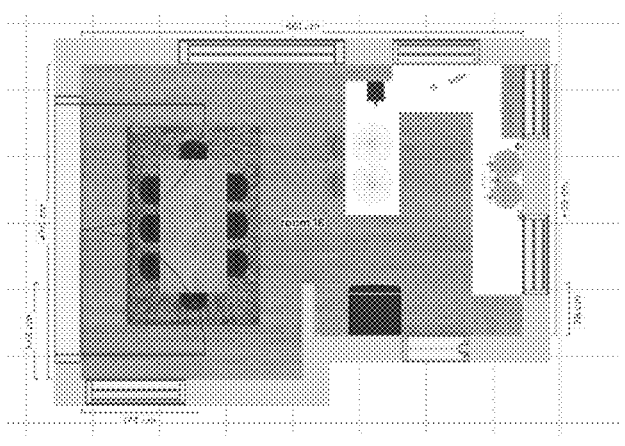
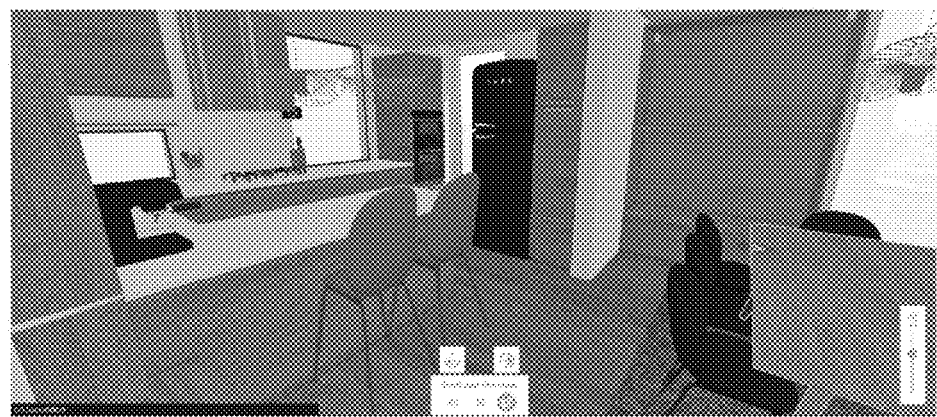
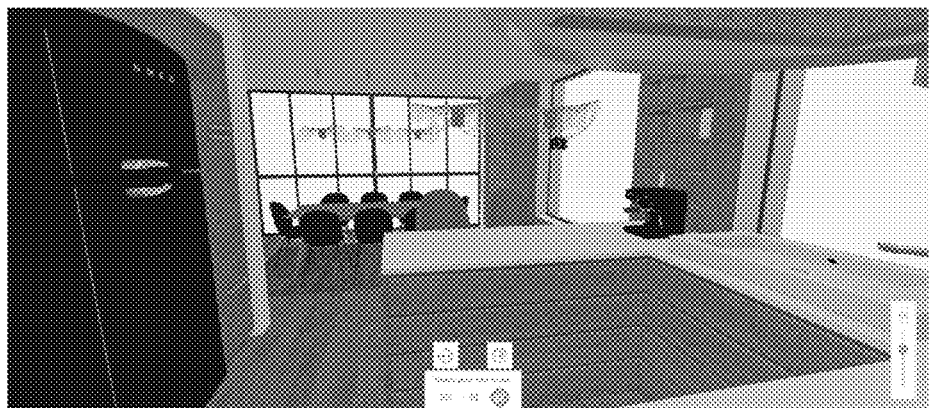
FIG. 8

MACHINE-LEARNING FUNCTION FOR OUTPUTTING CAMERA VIEWPOINTS

CROSS REFERENCE TO RELATED APPLICATIONS

This application claims priority under 35 U.S.C. § 119 or 365 European Patent Application No. 23306383.3 filed on Aug. 16, 2023. The entire contents of the above application are incorporated herein by reference.

TECHNICAL FIELD

The disclosure relates to the field of computer programs and systems, and more specifically to a method, system and program for determining a machine-learning function configured for taking an input 3D scene and for outputting one or more camera viewpoints each for generating a respective 2D rendering of the 3D scene.

BACKGROUND

A number of systems and programs are offered on the market for the design, the engineering and the manufacturing of objects. CAD is an acronym for Computer-Aided Design, e.g., it relates to software solutions for designing an object. CAE is an acronym for Computer-Aided Engineering, e.g., it relates to software solutions for simulating the physical behavior of a future product. CAM is an acronym for Computer-Aided Manufacturing, e.g., it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA, 3DVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Interior design increasingly involves the creation of virtual indoor 3D scenes representing real rooms. To illustrate these indoor 3D scenes, images may be taken from specific viewpoints of the 3D scene. Automatic methods to determine viewpoints for virtual visits of indoor scenes are not generally known in the literature. The literature rather studies viewpoint inference for single objects.

Referring to the list of prior art references provided hereinbelow, the method of reference [1] aims at speeding up the viewpoint inference for single objects by learning to infer viewpoints that maximize certain metrics such as the number of faces of the mesh of the object visible from the inferred viewpoint. The proposed method relies strongly on the hypothesis that there is only a single object observed. For instance, the viewpoints found are determined by finding coordinates on a sphere centered on the object. This surely simplifies the problem (looking for coordinates on a surface instead of a volume) but cannot be applied at all for 3D scene viewpoint inference for obvious reasons (size of the search space and limitation with respect to the room topologies). Moreover, even if some metrics could be computed to determine good viewpoints of a single object, those can be harder to define for 3D scenes (even more implicit).

Also, certain methods (e.g., the one in reference [2]) attempt to infer an evaluation of the aesthetics of an image based on a learning on a dataset made by users. However, such approaches are clearly not mature enough yet to automatically determine viewpoints for virtual visits of indoor scenes. In particular, one of the issues is that the dataset constructed is not operational. Secondly, this too differs from the indoor scene field and, even if these methods were applied to this field, it is not clear how such a method could construct a relevant dataset (e.g., regarding the question of random camera versus user-placed camera or the question of graded users rendering). Thirdly, such approaches only give a score for a given image and do not tackle at all the problem of finding the correct camera parameters (e.g., position and orientation) to obtain this image.

Few rule-based methods can also be thought off to define plausible camera positions (e.g., cameras placed in front of each center of each wall with sight looking at the center of the corresponding wall). However, those can easily fail in complex room architectures.

On the ones that do not use neural networks, the literature includes the method of reference that [10] relies on heuristic based methods such as computing triangle density for several views and keeping the viewpoints for which the density is the higher (making the assumption that the higher the density is, the more information there is in the image). The method of reference [11] explores a similar approach. However, those methods are more suited for dataset construction purposes (mainly because they can be very slow).

Reference [9] proposes a data driven approach to select viewpoints for 3D scenes. In this document, the distribution of an example set of good renderings is modeled using n probability density functions representing the x, y, and depth positions of pixels for each n semantic classes in the example set. Then, candidate positions are generated by sampling viewpoints according to the probability density functions estimated above. Afterwards, a set of candidate views that approximately match the entire probability density field as a set is chosen using an algorithm based on submodular maximization. However, this method has some failure cases and requires a lot of computation (distribution estimation, candidate properties estimation and selection). It is not deep learning based and more suited for dataset construction, such as in references [10] and [11].

The literature also includes reference [8] which has also been published for single objects (and not applicable to 3D scenes) but tried to learn best viewpoints from human preferences from human labeled viewpoints.

LIST OF REFERENCES

[1] Schelling, M., Hermosilla, P., Vázquez, P. P., & Ropinski, T. (2021 May). Enabling Viewpoint Learning through Dynamic Label Generation. In Computer Graphics Forum (Vol. 40, No. 2, pp. 413-423).

[2] Talebi, H., & Milanfar, P. (2018). NIMA: Neural image assessment. IEEE transactions on image processing, 27 (8), 3998-4011.

[3] Li, Y., Bu, R., Sun, M., Wu, W., Di, X., & Chen, B. (2018). Pointcnn: Convolution on x-transformed points. Advances in neural information processing systems, 31.

[4] Wang, K., Lin, Y. A., Weissmann, B., Savva, M., Chang, A. X., & Ritchie, D. (2019). Planit: Planning and instantiating indoor scenes with relation graph and spatial prior networks. ACM Transactions on Graphics (TOG), 38 (4), 1-15.

[5] Corso, G., Cavalleri, L., Beaini, D., Liò, P., & Veličković, P. (2020). Principal neighbourhood aggregation for graph nets. Advances in Neural Information Processing Systems, 33, 13260-13271.

[6] Paschalidou, D., Kar, A., Shugrina, M., Kreis, K., Geiger, A., & Fidler, S. (2021). Atiss: Autoregressive transformers for indoor scene synthesis. *Advances in Neural Information Processing Systems,* 34, 12013-12026.

[7] Vaswani, A., Shazeer, N., Parmar, N., Uszkoreit, J., Jones, L., Gomez, A. N., . . . & Polosukhin, I. (2017). Attention is all you need. *Advances in neural information processing systems,* 30.

[8] Hartwig, S., Schelling, M., Onzenoodt, C. V., Vázquez, P. P., Hermosilla, P., & Ropinski, T. (2022 September). Learning Human Viewpoint Preferences from Sparsely Annotated Models. In *Computer Graphics Forum* (Vol. 41, No. 6, pp. 453-466).

[9] Genova, K., Savva, M., Chang, A. X., & Funkhouser, T. (2017). Learning where to look: Data-driven viewpoint set selection for 3d scenes. *arXiv preprint arXiv: 1704.02393.*

[10] Roberts, M., Ramapuram, J., Ranjan, A., Kumar, A., Bautista, M. A., Paczan, N., . . . & Susskind, J. M. (2021). Hypersim: A photorealistic synthetic dataset for holistic indoor scene understanding. In *Proceedings of the IEEE/ CVF international conference on computer vision* (pp. 10912-10922).

[11] Zhang, Y., Song, S., Yumer, E., Savva, M., Lee, J. Y., Jin, H., & Funkhouser, T. (2017). Physically-based rendering for indoor scene understanding using convolutional neural networks. In *Proceedings of the IEEE conference on computer vision and pattern recognition* (pp. 5287-5295).

Within this context, there is still a need for an improved solution for outputting one or more camera viewpoints of a 3D scene.

SUMMARY

It is therefore provided a computer-implemented method for determining a machine-learning function configured for taking an input 3D scene and for outputting one or more camera viewpoints each for generating a respective 2D rendering of the 3D scene. The method comprises obtaining a library comprising 3D scenes and, for each 3D scene, one or more camera viewpoints each for generating a respective 2D rendering of the 3D scene. The method comprises, based on the library, forming a first dataset for training a first neural network configured for taking a first input representation of a 3D scene and for outputting information corresponding to a camera position in the 3D scene. The method comprises, based on the library, forming a second dataset for training a second neural network configured for taking a second input representation of a 3D scene and for outputting information corresponding to a camera orientation in the 3D scene. The method comprises training the first neural network based on the first dataset and training the second neural network based on the second dataset. Each camera viewpoint outputted by the machine-learning function comprises a camera position corresponding to information outputted by the first neural network and a camera orientation corresponding to information outputted by the second neural network.

The method may comprise one or more of the following:

The forming of the first dataset comprises, for each 3D scene:

determining a set of starting positions regularly distributed on a floor plan of the 3D scene; and for each camera viewpoint of the 3D scene, determining an offset vector between the camera position of the camera viewpoint and the closest starting position, The first neural network is configured to further take as input a starting position in the 3D scene. The information outputted by the first neural network comprises an offset vector between a camera position and the starting position;

The starting positions of each set are substantially equidistant from each other. The distance between the starting positions is substantially the same for each 3D scene;

The starting positions of each set are distributed so as to form a regular 2D grid on the floor plan of the 3D scene. Each starting position corresponds to a respective vertex of the regular 2D grid;

The first input representation and/or the second input representation includes a set of geometrical characteristics of 3D objects of the 3D scene;

The first input representation and/or the second input representation includes a graph comprising nodes each representing a respective object of the 3D scene and arcs each linking a respective pair of nodes. The 3D objects represented by the nodes of a pair are arranged according to a mutual arrangement relationship from a predetermined set of one or more mutual arrangement relationships;

The predetermined set of one or more mutual arrangement relationships includes an adjacency relationship, a proximal relationship, a distance relationship and/or a vertical superposition relationship;

The second neural network further takes as input a camera position outputted by the first neural network;

The first neural network has an architecture including a graph neural network (GNN) model and a multilayer perceptron (MLP) model. The MLP model takes as input a concatenation of the output of the GNN model and coordinates of a starting position;

The second neural network has an architecture including a graph neural network (GNN) model and a multilayer perceptron (MLP) model. The MLP model takes as input a concatenation of the output of the GNN model and coordinates of a camera position outputted by the first neural network;

The machine learning function comprises a post-processing block. The post-processing block is configured for selecting the outputted one or more camera viewpoints among a set of camera viewpoints determined by applying the first neural network and the second neural network to each starting position of a set of starting positions regularly distributed on a floor plan of the input 3D scene; and/or the selecting of the outputted one or more camera viewpoints comprises:

determining, for each camera viewpoint, the 3D objects of the input 3D scene which are visible in a 2D rendering generated from the camera viewpoint; and selecting one or more of the determined camera view-
points so that the 3D objects which are visible in the
one or more 2D renderings generated from the one or
more selected camera viewpoints represent at least a
predetermined percentage of all the 3D objects
which are present in the 3D scene.

It is further provided a computer program comprising
instructions for performing the method.

It is further provided a computer readable storage medium
having recorded thereon the computer program.

It is further provided a system comprising a processor
coupled to a memory, the memory having recorded thereon
the computer program. The system may comprise a graphi-
cal user interface.

It is further provided a device comprising a data storage
medium having recorded thereon the computer program.
The device may form or serve as a non-transitory computer-
readable medium, for example on a Saas (Software as a
service) or other server, or a cloud-based platform, or the
like. The device may alternatively comprise a processor
coupled to the data storage medium. The device may thus
form a computer system in whole or in part (e.g., the device
is a subsystem of the overall system). The system may
further comprise a graphical user interface coupled to the
processor.

It is further provided a method of use of a machine-
learning function determined according to the method. The
method of use comprising using the machine-learning func-
tion. The use of the machine-learning function comprises
obtaining an input 3D scene and applying the machine-
learning function to the obtained input 3D scene, thereby
outputting one or more camera viewpoints each for gener-
ating a respective 2D rendering of the obtained input 3D
scene.

It is further provided a machine-learning function deter-
mined according to the method. The machine-learning func-
tion is configured for taking an input 3D scene and for
outputting one or more camera viewpoints each for gener-
ating a respective 2D rendering of the 3D scene.

BRIEF DESCRIPTION OF THE DRAWINGS

Non-limiting examples will now be described in reference
to the accompanying drawings, where:

FIG. 1 shows a flowchart of an example of the method;
FIGS. 4, 5, 6, 7 and 8 show examples of results of the
machine learning function.

DETAILED DESCRIPTION

Figure 2:
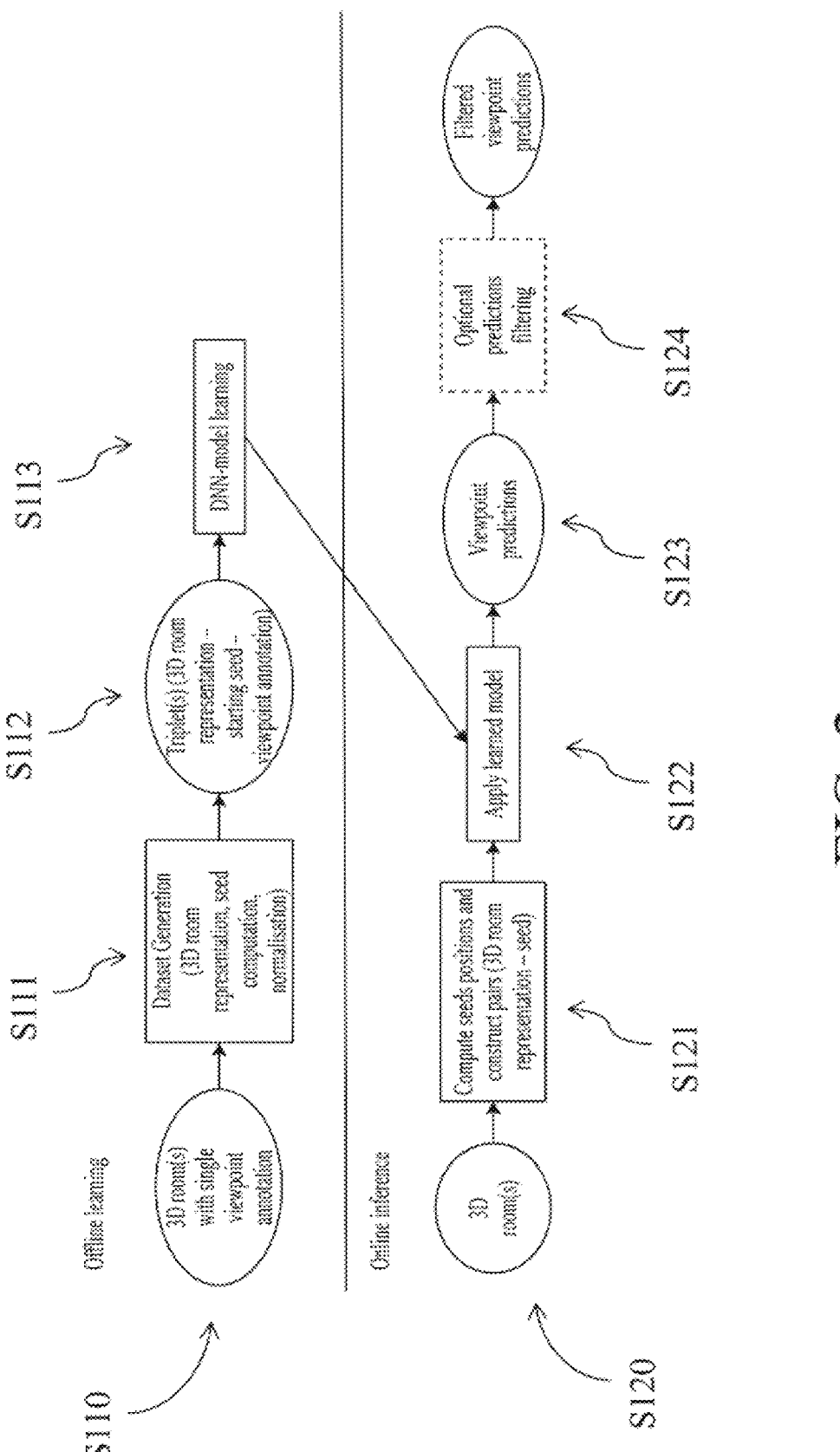
FIG. 2 shows a flowchart of an example of the offline and
online stages.

With reference to the flowchart of FIG. 1, there is
described a computer-implemented method for determining
a machine-learning function configured for taking an input
3D scene and for outputting one or more camera viewpoints
each for generating a respective 2D rendering of the 3D
scene. The method comprises obtaining S10 a library com-
prising 3D scenes and, for each 3D scene, one or more
camera viewpoints each for generating a respective 2D rendering of the 3D scene. The method comprises, based on
the library, forming S20 a first dataset for training a first
neural network configured for taking a first input represen-
tation of a 3D scene and for outputting information corre-
sponding to a camera position in the 3D scene. The method
comprises, based on the library, forming S30 a second
dataset for training a second neural network configured for
taking a second input representation of a 3D scene and for
outputting information corresponding to a camera orienta-
tion in the 3D scene. The method comprises training S40 the
first neural network based on the first dataset and training the
second neural network based on the second dataset. Each
camera viewpoint outputted by the machine-learning func-
tion comprises a camera position corresponding to informa-
tion outputted by the first neural network and a camera
orientation corresponding to information outputted by the
second neural network.

Such a method forms an improved solution for outputting
one or more camera viewpoints of a 3D scene.

Notably, the method allows training a function for out-
putting one or more camera viewpoints. In particular, the
method allows training the function based on a library of 3D
scenes. Indeed, the method comprises the forming of two
datasets (one for each neural network) for the training of the
function. Starting directly from the library of 3D scenes, the
method therefore allows automatically performing the train-
ing of the function for outputting the camera viewpoints.

Moreover, using a first neural network for the camera
position and a second neural network for the camera orien-
tation improves the optimality of the outputted camera
viewpoints. Indeed, the forming the first and second datasets
based on the library (that includes optimal camera view-
points for each 3D scene) allows training both neural
networks to infer optimal camera viewpoints. Optimality
means that a large number of objects are present in each
outputted camera viewpoint. The method improves the train-
ing of each neural network, and therefore the optimality of
the camera viewpoints outputted by the neural networks
after the training.

Furthermore, considering a first neural network for the
camera position and a second neural network for the camera
orientation is particularly relevant. Indeed, these two param-
eters (position and orientation of the camera) allow defining
a unique point of view, and the training for predicting these
two parameters may be dissociated. It makes the use of a
respective neural network for each of these parameters
particularly relevant. Additionally, considering a specific
neural network for each parameter is a good compromise
between specialization of each neural network and difficulty
of the training. Indeed, it allows having neural networks
trained each for capturing the specificities of these param-
eters in the library of 3D scenes, while maintaining a
reasonable number of neural networks to be trained (i.e., two
networks: one for the camera position and another one for
the camera orientation).

The method is computer-implemented. This means that
steps (or substantially all the steps) of the method are
executed by at least one computer, or any system alike.
Thus, steps of the method are performed by the computer,
possibly fully automatically, or, semi-automatically. In
examples, the triggering of at least some of the steps of the
method may be performed through user-computer interac-
tion. The level of user-computer interaction required may
depend on the level of automatism foreseen and put in
balance with the need to implement user's wishes. In
examples, this level may be user-defined and/or pre-defined.

A typical example of computer-implementation of a method is to perform the method with a system adapted for this purpose. The system may comprise a processor coupled to a memory and a graphical user interface (GUI); the memory having recorded thereon a computer program comprising instructions for performing the method. The memory may also store a database. The memory is any hardware adapted for such storage, possibly comprising several physical distinct parts (e.g., one for the program, and possibly one for the database).

The library of 3D scenes, the first dataset and/or the second dataset may be stored in a database. By "database", it is meant any collection of data (i.e., information) organized for search and retrieval (e.g., a relational database, e.g., based on a predetermined structured language, e.g., SQL). When stored on a memory, the database allows a rapid search and retrieval by a computer. Databases are indeed structured to facilitate storage, retrieval, modification, and deletion of data in conjunction with various data-processing operations. The database may consist of a file or set of files that can be broken down into records, each of which consists of one or more fields. Fields are the basic units of data storage. Users may retrieve data primarily through queries. Using keywords and sorting commands, users can rapidly search, rearrange, group, and select the field in many records to retrieve or create reports on particular aggregates of data according to the rules of the database management system being used.

The method generally manipulates modeled (3D) objects. A modeled object is any object defined by data stored e.g., in the database. By extension, the expression "modeled object" designates the data itself. According to the type of the system, the modeled objects may be defined by different kinds of data. For example, the system may be a CAD system, and modeled objects may be defined by corresponding data (one may speak of CAD objects).

By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g., non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g., representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled, and turned around any of its axes, or around any axis in the screen on which the representation is displayed. This notably excludes 2D icons, which are not 3D modeled. The display of a 3D representation facilitates design (i.e., increases the speed at which designers statistically accomplish their task). This speeds up the manufacturing process in the industry, as the design of the products is part of the manufacturing process.

A CAD system may be history-based. In this case, a modeled object is further defined by data comprising a history of geometrical features. A modeled object may indeed be designed by a physical person (i.e., the designer/user) using standard modeling features (e.g., extrude, revolute, cut, and/or round) and/or standard surfacing features (e.g., sweep, blend, loft, fill, deform, and/or smoothing). Many CAD systems supporting such modeling functions are history-based system. This means that the creation history of design features is typically saved through an acyclic data flow linking the said geometrical features together through input and output links. The history-based modeling paradigm is well known since the beginning of the 80's. A modeled object is described by two persistent data representations: history and B-rep (i.e., boundary representation). The B-rep is the result of the computations defined in the history. The shape of the part displayed on the screen of the computer when the modeled object is represented is (e.g., a tessellation of) the B-rep. The history of the part is the design intent. Basically, the history gathers the information on the operations which the modeled object has undergone. The B-rep may be saved together with the history, to make it easier to display complex parts. The history may be saved together with the B-rep in order to allow design changes of the part according to the design intent.

Each 3D scene may represent a real room. Each 3D scene of the library may comprise one or more 3D objects. Some (e.g., all) of 3D scenes of the library and/or the input 3D scene may represent complex rooms, i.e., may each include several objects (e.g., more than ten or one hundred objects) and/or may each be non-rectangular in shape (e.g., with more than four walls and/or including one or more circular walls). Each 3D object of the 3D scene may represent the geometry of a real object positioned (or to be positioned) in the real room represented by the 3D scene. The real object may be manufactured in the real world subsequent to the completion of its virtual design (e.g., using a CAD software solution or a CAD system). The 3D scenes of the library may each comprise one or more furniture objects and/or one or more decorative objects. Any furniture object herein may have a furnishing function in the room where they are placed. For examples, the 3D scenes of the library may each comprise one or more chairs, one or more lamps, one or more cabinets, one or more shelves, one or more sofas, one or more tables, one or more beds, one or more sideboards, one or more nightstands, one or more desks and/or one or more wardrobes. Any decorative object herein may have a decorative function in the room where they are placed. For example, the 3D scenes of the library may each comprise one or more accessories, one or more plants, one or more books, one or more frames, one or more kitchen accessories, one or more cushions, one or more lamps, one or more curtains, one or more vases, one or more rugs, one or more mirrors and/or one or more electronic objects (e.g., refrigerator, freezer and/or washing machine).

The method may be used in a generating process, which may comprise, after the performing of the method, using a machine-learning function (inference phase) determined by the method to generate one or more camera viewpoints of a room. In that case, the method may be included in the generating process (i.e., the forming of the datasets and the training of the neural networks may be performed during the generating process). Alternatively, the method may alternatively be performed prior to the executing of the generating process (i.e., the machine-learning function may already be trained at the time the generating process is executed).

The one or more camera viewpoints may be generated for a user such as the owner of the home in which the room is located. The generating process may comprise obtaining an input 3D scene representing the room to be arranged (e.g., an input 3D scene provided by the user). Then, the generating process may comprise applying the determined machine-learning function to the obtained input 3D scene, thereby automatically generating the one or more camera viewpoints for the input 3D scene (i.e., the one or more viewpoints outputted by the function). In examples, the generating process may then comprise recording the generated one or more camera viewpoints, e.g., in a database, for example accessible online by the user.

In example, the generating process may be used in a virtual visit process. For example, the generating process may be included in the virtual visit process, or alternatively may be performed prior to the virtual visit process (the virtual visit process therefore being performed based on the one or more camera viewpoints generated by the executing of the generating process). The virtual visit process may comprise determining images and/or videos of the room based on the generated one or more camera viewpoints. For example, the virtual visit process may comprise generating the respective 2D rendering (i.e., the image and/or the video) of each determined camera viewpoint. The respective 2D rendering may include a rendering of the objects, the walls and/or the window(s)/door(s) that are visible from the viewpoint. The virtual visit process may then comprise assembling the generated 2D renderings, for example in the form of a video showing the various 2D renderings generated in succession. The virtual visit process may comprise or be based on a repetition of the generating process. For example, the generating process may be repeated for each room in a house or apartment. In this case, the virtual visit process may generate a virtual visit of all the rooms in the house or apartment (i.e., including 2D renderings of all the rooms).

The virtual visit process may be included in a real-life room design process, which may comprise, after performing the virtual visit process, using the generated 2D rendering(s) for deciding whether or not to acquire one or more new real objects for the room. Each new real object may have a respective object (representing the new real object, i.e., a virtual model of the real object) which is positioned inside the input 3D scene. For example, the real-life room design process may comprise, prior to the virtual visit process, a step of positioning the respective object representing each new real object inside the input 3D scene (e.g., using a virtual catalog comprising virtual representations for new objects or by creating from scratch the respective object representing each new object). The respective object(s) representing the new real object(s) may be visible in the generated 2D rendering(s). The generated 2D rendering(s) may help the user make a choice by illustrating the one or more new objects positioned inside the room (i.e., positioned with respect to the other objects of the room).

Alternatively or additionally, the real-life room design process may comprise, after the performing of the virtual visit process, physically arranging a (i.e., real) room so that its design matches the input 3D scene. For example, the room (without the one or more new objects) may already exist in the real world, and the real-life room design process may comprise positioning the one or more new real objects inside the already existing room (i.e., in the real world). The new real object(s) may be positioned at the same position as the respective object(s) that represent(s) them in the input 3D scene. Alternatively, the room may not already exist at the time the method is executed. In that case, the real-life room design process may comprise building a room according to the provided 3D scene (i.e., starting from scratch and by placing objects as in the provided 3D scene). Because the method improves the acquisition of new real object(s) for a room, the method also improves the positioning of the new real object(s) and/or the building of the room, and thus increases productivity of the real-life room design process.

The method may comprise a step of forming the library (library-forming step). In that case, the obtaining S10 may comprise the library-forming step. The library-forming step may comprise providing the 3D scenes and/or the camera viewpoints of the 3D scenes. The providing of the 3D scenes and/or the camera viewpoints may be performed upon user interaction. For example, each 3D scene may have been created by a user (e.g., using a software solution for creating 3D scenes of rooms). The creation of a 3D scene may comprise defining walls/doors of the room and positioning 3D objects inside defined walls. The providing of the camera viewpoints may also be performed by the user. For example, the providing of each camera viewpoints may comprise determining the camera position and the camera orientation of the camera viewpoint. After the library-forming step, the obtaining S10 may comprise recording the computed library in a database, and steps S20 and S30 may be executed by accessing the recorded library.

Alternatively, the method may comprise retrieving the library of 3D scenes in a database. The library of 3D scenes may optionally in such a case have been obtained according to the above library-forming step (prior to the executing of the method). In that case, the obtaining S10 may comprise providing an access to the library of 3D scenes in the database. The method may use this access to form (during steps S20 and S30) the first and second datasets.

The forming S20 of the first dataset may be performed in any manner. The forming S20 may comprise determining the training samples of the first dataset. For example, the forming S20 may comprise, for each 3D scene of the library, associating a respective input representation of the 3D scene with the information corresponding to the camera position of each camera viewpoint of the 3D scene (each association corresponding to a respective training sample of the first dataset). Each training sample of the first dataset may comprise an input representation associated with information corresponding to a camera position.

The information corresponding to a camera position may comprise a vector having values representing coordinates of a point in a plan representing the camera in the floor plan of the 3D scene. For example, the coordinates may be defined in a reference coordinate system (e.g., arbitrarily selected). Alternatively, the coordinates may be defined from a starting position in the 3D scene. In that case, the vector may be an offset vector defined between the camera position and the starting position. The 3D scene may comprise a floor plan and a set of starting positions regularly distributed on this floor plan. The offset vector may be defined between the camera position and the closest starting position (i.e., among all the starting positions in the set).

Similarly, the forming S30 of the second dataset may be performed in any manner and may comprise determining the training samples of the second dataset. For example, the forming S30 may comprise, for each 3D scene of the library, associating a respective input representation of the 3D scene with information corresponding to the camera orientation of each camera viewpoint of the 3D scene (each association corresponding to a respective training sample of the second dataset). The forming S30 may further comprise, for each 3D scene of the library, associating a respective input representation of the 3D scene with information corresponding to the camera orientation of each camera viewpoint of the 3D scene. In that case, each training sample of the second dataset may comprise an input representation associated with information corresponding to a camera orientation and information corresponding to a camera position. When the first dataset is formed first, the forming S30 of the second dataset may be performed based on the already formed first dataset. For example, the forming S30 of the second dataset may comprise adding, to each training sample of the first dataset, an association to the information corresponding to the camera orientation of the camera viewpoint represented by the training sample (i.e., in addition to the association to the information corresponding to the camera position already included in the first dataset).

In examples, the method may form the first and second datasets with the same 3D scenes of the library (i.e., each dataset may comprise training samples determined for the same 3D scenes), e.g., with all the 3D scenes of the library. In that case, the first and second datasets may take the form of a single table. For example, this single table may comprise rows representing each of the training samples and columns representing the values of each training sample. For example, the single table may comprise a first column for the input representation, a second column for the camera position and a third column for the camera orientation. In that case, the first dataset may be formed by the first and second columns, and the second dataset by the first, second and third columns. Alternatively, the method may form the first dataset based on a first subset of the 3D scenes of the library and may form the second based on a second subset of the 3D scenes of the library. In that case, each subset may comprise 3D scenes of the library that are common with the other subset, and other that are not. In that case, the two datasets may each take the form of the respective table, or alternatively may also be combined in a single table, with, e.g., empty values when 3D scenes are not present in both datasets.

The camera orientation may be a description of the direction in which the camera is pointing in the 3D scene space. The camera orientation may be defined in relation to a reference coordinate system (e.g., including three vectors). The information corresponding to the position of the camera may comprise angle values each representing a rotation between the direction pointed by the camera and a respective vector of the reference coordinate system.

In examples, the second neural network further takes as input a camera position outputted by the first neural network. In that case, each training sample of the second dataset may further comprise the information corresponding to the camera position of the camera viewpoint (in addition to the information corresponding to the camera orientation). The forming S30 may comprise, for each 3D scene of the library, associating the respective input representation of the 3D scene with also the information corresponding to the camera position of each camera viewpoint of the 3D scene. Each training sample of the second dataset may comprise an input representation associated with information corresponding to a camera orientation and to a camera position.

In examples, the forming S20 of the first dataset and forming S30 of the second dataset may be performed at the same time. For example, the first dataset may correspond to a portion of the second dataset (the first dataset including each training sample of the second dataset but without the information regarding the camera orientation for each training sample). In that case, the forming S30 of the second dataset may be performed as described above, and the forming S20 of the first dataset may consist in extracting the portion of the second dataset which corresponds to the first dataset (i.e., the association, for each camera viewpoint, of the input representation with the information regarding the camera position only).

In examples, during the inference phase, the first neural network may be configured to further take as input a starting position. The starting position may be among a set of starting positions regularly distributed on the floor plan of the 3D scene taken as input by the first neural network. In that case, the forming S20 may comprise, for each 3D scene, determining S21 a set of starting positions regularly distributed on the floor plan of the 3D scene. The starting positions of each set may be substantially equidistant from each other. The distance between the starting positions may be substantially the same for each 3D scene. For example, the distance between adjacent starting positions may be lower than 3 meters and/or higher than 50 centimeters, e.g., between 75 centimeters and 1.50 meter (e.g., approximately 1 meter). The starting positions of each set may be randomly distributed (e.g., in an accessible space of the room, i.e., free of objects). Alternatively, the starting positions of each set may be regularly distributed so as to form a regular pattern on the floor plan of the 3D scene (e.g., a pattern comprising concentric circles or a grid pattern). For example, the starting positions of each set may be distributed so as to form a regular 2D grid. Each starting position may correspond to a respective vertex of this regular 2D grid. During the inference phase, the information outputted by the first neural network may comprise an offset vector between a camera position and the starting position taken as input.

After the determining S21, the forming S20 may comprise, for each camera viewpoint of the 3D scene, determining S22 an offset vector between the camera position of the camera viewpoint and the closest starting position. The determining S22 of the offset vector may comprise computing the distance between the camera position and each starting position of the set, the closest starting position being the one having the smallest distance. Then, the determining S22 of the offset vector may comprise determining coordinates of the offset vector in a reference coordinate system (each coordinate representing the distance between the camera viewpoint and the closest starting position along a respective direction of the reference coordinate system).

The set of starting positions and the offset vector improve the training of the neural networks, and therefore the inference of camera viewpoints by these neural networks. Indeed, the set of starting positions allows an abstraction of local patterns and decontextualized learning. The set of starting positions allows considering portions of the 3D scene, and the offset vector allows considering that each ground truth applies to a respective portion of the 3D scene. Each starting position represents a perimeter within which each neural network is trained to predict the value present in the training set. They therefore allow considering the fact that ground truths apply for respective portions of the 3D scene, and other ground truths may exist at other points in the 3D scene.

Any input representation of a 3D scene may include a set of geometrical characteristics of (e.g., all) 3D objects of the 3D scene. The geometrical characteristics may include, for each 3D object, the position, the orientation and/or the dimension of the 3D object. The position may comprise coordinates of the center of the 3D object in a reference coordinate system. The orientation of the 3D object may be defined with respect to a reference position. For example, the orientation may comprise angle values each representing the rotation, along a respective vector of the reference coordinate system, of the 3D object as positioned in the 3D scene with respect to the reference position of the 3D object.

In examples, any input representation a 3D scene may include a voxelization of the 3D scene. The voxelization may comprise a regular mesh of voxels on the 3D scene space. Each voxel may comprise information about the presence of an object in the area delimited by the voxel (e.g., 0 when no object is present, or 1 otherwise). The voxelization may provide the set of geometrical characteristics (i.e., the position, the orientation and/or the dimension) of each 3D object. Alternatively, any input representation a 3D scene may include a graph comprising nodes each representing a respective object of the 3D scene and arcs each linking a respective pair of nodes. The 3D objects represented by the nodes of a pair may be arranged according to a mutual arrangement relationship from a predetermined set of one or more mutual arrangement relationships. Each edge may comprise a label indicating the mutual arrangement relationship between the two objects represented by the nodes linked by the edge. Each node of the graph may comprise the set of geometrical characteristics (i.e., the position, the orientation and/or the dimension) of the 3D object that the node represents.

In examples, the predetermined set may comprise an adjacency relationship. Two objects may be arranged according to the adjacency relationship when they are spaced from each other by less than a first predetermined distance (e.g., 5 centimeters). Alternatively or additionally, the predetermined set may comprise a proximal relationship. Two objects may be arranged according to the adjacency relationship when they are spaced from each other by more than the first predetermined distance and by less than a second predetermined distance (e.g., 50 centimeters). Alternatively or additionally, the predetermined set may comprise a distance relationship. Two objects may be arranged according to the distance relationship when they are spaced from each other by more than the second predetermined distance. For each relationship, the distance may be the distance between bounding boxes representing the two objects in the 3D scene (e.g., a distance defined along one of the axes of one of the two objects). Alternatively or additionally, the predetermined set may comprise a vertical superposition relationship. Two objects may be arranged according to the adjacency relationship when they are positioned one above the other (e.g., a lamp on the ceiling that is located above a table).

In examples, the method may comprise determining a respective input representation for one or more (e.g., all) of the 3D scenes of the library. The determining of the input representations may be performed during the forming of the datasets. The determining of a respective input representation for a 3D scene (representation-forming step) may comprise determining the geometrical characteristics of the 3D objects of the 3D scene. For example, the representation-forming step may comprise determining the positioning, orientation and/or dimensional information (optionally the bounding box) of each 3D object of the 3D scene. In examples, the representation-forming step may also comprise determining the graph of the 3D scene. The determining of the graph may comprise determining each node and each arc of the graph according to the objects of the 3D scene. Each node of the graph may comprise the positioning, orientation and/or dimensional information (optionally the bounding box) determined for the object of the 3D scene that the node represents in the graph.

Alternatively, the library may comprise the respective input representation of each 3D scene. In that case, the method may comprise retrieving the respective input representations of the 3D scenes during the forming of each dataset (steps S20 and S30). The input representations included in the library of 3D scenes may optionally in such a case have been obtained according to the above representation-forming step (prior to the executing of the method).

The obtaining of the library (step S10), the forming of the first and second datasets (steps S20 and S30) and/or the training of the first and second neural networks (step S40) may be performed during an offline stage. In that case, the obtained library, the first and second datasets and/or the determined machine-learning function (including the trained first and second neural networks) may for example be recorded in a database during this offline stage. After this offline stage, the determined machine-learning function may be used during an online stage (inference phase). For example, the determined machine-learning function may be used by client computer(s) each configured for providing input 3D scene(s) to a server, this server having access to the database and being configured to apply the machine-learning function to the provided input 3D scenes, and to provide the camera viewpoints outputted by the function for each input 3D scene to the client computer(s) providing the input 3D scene (or 2D rendering(s) generated, e.g., also by the server, for each camera viewpoint).

The method may comprise updating the first and second datasets (e.g., regularly). For example, the library may be expanded by users providing newly created 3D scenes with camera viewpoints, and the method may comprise updating the first and second datasets to include these newly created 3D scenes (e.g., by adding the newly created 3D scenes and their respective camera viewpoints to the first and second datasets). In that case, the method may comprise, after the updating, retraining the first neural network based on the updated first dataset and retraining the second neural network based on the updated second dataset.

The method is now further discussed with reference to FIGS. 2 to 12.

The method may consist in a fully automatic way to infer viewpoints of a 3D room that can be used to define a virtual visit of the 3D room. In the case of inference of viewpoints for a virtual visit of a 3D scene, the method may allow showcasing the complexity of the 3D scene, i.e., the objects the scene, may give information about their relative positioning from a user standpoint, and may give all this information with a minimal set of inferred viewpoints.

The method may consist in a method to train neural networks (training phase) to infer 3D viewpoints of 3D scenes (or 3D rooms) from a library (a dataset) of 3D rooms with some (few) 3D viewpoints annotations (the camera viewpoint(s) of each 3D room). Optionally, the method may also include a selection step to filter those viewpoints to select a minimal set of viewpoints that may be used to construct virtual visits of the 3D rooms (inference phase).

The method comprises the training phase. The training phase comprises the forming S20 of the first dataset. The forming S20 comprises, for each 3D rooms in the dataset, optionally defining S21 a set of plausible camera positions (the set of starting positions), optionally finding S22, for each ground truth viewpoint position (camera position) present in the dataset for the 3D room, the closest plausible camera position from the ground truth viewpoint position and storing the offset vector from the plausible camera position to the ground truth viewpoint position. Then, the training phase comprises the training S40. The training S40 comprises, optionally, providing a first neural network that takes as input a 3D room (e.g., a 3D graph representation of the 3D room) and an initial camera position and outputs a 3-dimensional vector (the offset vector from the initial camera position). Then, the training S40 comprises applying a learning algorithm to the first neural network in order to train it to output the correct offset vector given every 3D room and the corresponding initial camera position in the dataset. The training S40 also comprises, optionally, providing a second neural that takes as input a 3D room (e.g., a 3D graph representation of the 3D room) and a camera position and outputs a 3-dimensional vector (e.g., one for each angle of the orientation). Then, the training S40 comprises applying a learning algorithm to the second neural network in order to train it to output the correct ground truth orientation vector given a every 3D room and the corresponding ground truth viewpoint position.

The inference phase (the method of use) comprises, given a 3D room, defining a set of plausible camera positions. The inference phase comprises applying the offset vector inferred by the first trained neural network for each camera positions in the set of plausible camera positions to each corresponding camera positions in the set of plausible camera positions. The inference phase comprises inferring orientation vectors thanks to the second trained neural network for each new camera positions. The inference phase comprises applying a post processing step to keep the minimal set of inferred viewpoints that see a certain number of objects with respect to the total number objects that can be seen from every inferred viewpoint.

The method allows training a function for automatically inferring a set of viewpoints that can be linked together to construct a virtual visit of a given 3D room, maximizing the visibility of the key elements in the room (i.e., mainly the objects in it). The method is fully automatic, suited to any room type, and uses a very light representation of the room.

The method belongs to the field of 3D viewpoints inference for a 3D room. The aim of automatic viewpoints inference is to compute for a given room a set of camera viewpoints that give camera positions and orientations that can be used to construct virtual visits of the given room. A camera viewpoint may comprise a camera position and a camera orientation. The camera position and the camera orientation may be extrinsic parameters of the camera viewpoint. The camera viewpoint may also comprise intrinsic parameters (e.g., magnification, rendering window width, rendering window length, rendering color properties). The generating of the 2D rendering for a given camera viewpoint may consider the extrinsic parameters and the intrinsic parameters of the given camera viewpoint. A virtual visit is a navigation between the viewpoints inferred for a given room. A goal of the virtual visit is to observe a maximum number of objects in the scene.

The method may be included in a general process which may comprise two stages. In a first stage, the general process may comprise the construction and training of two models, one for viewpoint position inference, the other for viewpoint orientation inference (i.e., the executing of the method, also referred to as offline stage). In a second stage, the general process may comprise a viewpoint inference for any room based on the two trained models (also referred to as online stage).

With reference to FIG. 2, a flowchart of an example of offline and online stages are now discussed. The figure illustrates the distinction between the online and offline stages of the general process.

The offline stage S110 aims at producing models (neural networks) achieving the following tasks: (i) viewpoint position inference, (ii) viewpoint orientation inference for a given room based on the proposed learning scheme given a training dataset. The training dataset is a dataset composed of 3D rooms with one or several viewpoints per rooms. Those rooms are considered as well furnished and the viewpoints of good quality (the renderings were bought by users). The first neural network (also referred to as the viewpoint position inference model) takes as input a 3D room of the dataset with a starting position and learns to infer a 3D vector (named the offset) so that applying the 3D translation corresponding to the 3D predicted vector to the starting position matches a viewpoint position of the dataset for this 3D room. The second neural network (also referred to as the viewpoint orientation inference model) takes as input a 3D room of the dataset with a camera position from the viewpoint positions of the dataset for this 3D room and learns to infer the viewpoint orientation of the dataset for this 3D room.

Given a 3D room, the online stage S120 comprises defining a set of starting positions. For each position, the online stage S120 comprises applying the trained viewpoint position inference model to infer the offset and obtain the prediction position. Then, for each predicted position, the online stage S120 comprises using the viewpoint orientation inference model to infer the correct orientation for each of the predicted positions. Then, the online stage S120 comprises, optionally, applying a postprocessing step to keep a minimal set of viewpoints that assures a certain coverage of the 3D room in the corresponding renderings and construct the virtual visit thanks to them.

The offline stage S110 is now discussed in more details.

The library is composed of 3D rooms with one or several viewpoints per rooms. Those rooms may be considered as well furnished and the viewpoints of good quality (the renderings may be chosen and bought by users). The number of viewpoints per room may be really unbalanced with most of the 3D rooms having only one viewpoint. The method is designed in a manner that it may learn to generate several viewpoints for a single room even from an unbalanced dataset with only one viewpoint per room. An element of the first and/or second datasets may correspond to the pair of a 3D room representation and a viewpoint (named the ground truth) for the 3D room of the pair during the next sections.

The offline stage S110 comprises the determining S111 of the input representations of the 3D scenes. The method may use any representation of the 3D rooms. For example, with a point cloud representation, the method may use a backbone to compute 3D room representation. Referring to the list of prior art references provided hereinabove, this may be performed according to the teaching of reference [3]. In this example of implementation, the method uses a very condensed scene graph representation based on the PlanIT idea. Referring to the list of prior art references provided hereinabove, this may be performed according to the teaching of reference [4]. The graph structure used for the scene representation is structured as explained below.

Any scene graph is composed of:
A list of nodes that each corresponds to a 3D_Elem in the room with the following attributes:
the node ID;
the 3D bounding box of the 3D_Elem (length, width and height);
the transformation matrix of the 3D_Elem (to obtain the absolute position and orientation in the 3D room of the 3D_Elem);

the list of ingoing edges; and the list of outgoing edges.

A list of edges (undirected) representing the relations between the 3D_Elems in the room each with the following attribute:

An edge ID.

The method may obtain the scene graphs from already existing original scene graphs (computed prior to the method) and may comprise extracting the scene graphs from the already existing initial scene graphs. The extraction of the scene graphs may comprise deleting any semantic information in the graph (e.g., no category attribute for the nodes and the edges). This results in a representation that is very light since it contains less information than the original 3D room representation. It also allows the model to strongly generalize over the furniture categories and the room types.

For each input representation, the determining S111 may comprise applying a normalization to each of the node's attributes for stability purposes. The method may comprise determining the applied normalization factor with respect to the dimensions of the room dimensions as described below:

Let us define x0, y0, z0, x1, y1, z1 the minimal and maximal coordinates of the room along each axis and v=(x1−x0)+ (y1−y0)+ (z1−z0) the volume of the 3D room. The method may comprise normalizing the position of each object and the ground truth camera viewpoint with the following formula: p=(p−p0)/v. For the x coordinate, it becomes: x=(x−x0)/v. The bounding box parameters of each object is scaled by 1/v.

The offline stage S110 comprises the forming S112 of the datasets. The strategy to learn to infer several viewpoints for a given 3D room based on an unbalanced (or not) dataset relies on learning optimal local viewpoints and is detailed below. Unbalanced dataset means a dataset for which all the viewpoints' annotations are not present for all the rooms, i.e., the dataset may comprise one or several viewpoint annotations per 3D rooms. This also means that the method can learn to infer an optimal set of viewpoints for the virtual visit (according to the define objectives) for a given 3D room, even if in the dataset the number of viewpoints does not cover the entire room complexity (i.e., to see a certain percent of the objects in the room).

For each room, the forming S211 comprises defining a regular 2D grid to determine a set of starting points. Note that this represents a convenient way of obtaining this set of starting points, but the method may rely on other way of obtaining them (e.g., random, in the circulation area of the room, . . . ). The step size on each axis depends on the dimension of the room. The method may for example choose as a step size a dimension of:

Sx=Lx/N where Lx is the room dimension following the x axis, N a chosen parameter and Sx the step on the x axis.

Sy=Ly/M where Ly is the room dimension following the y axis, M a chosen parameter and Sy the step on the y axis.

The axis x and y may be the orthogonal axis in which the room is defined. After defining N and M (e.g., N=M=5) and obtaining the M*N number of starting points, the determining of the set of starting positions may comprise filtering the vertices of the defined regular 2D grid to only keep the ones that are inside the 3D space of the room (defined by the floor plan in this example).

The forming S112 comprises the determining, for each camera viewpoint, of an offset vector. This selection of the offset vector for the learning stage of the position inference model is now discussed.

During the learning stage, the determining of the offset vector comprises determining the ground truth camera position (the camera position of the camera viewpoint in the library) and searching for the closest starting position (based on the x and y coordinates) from the vertices of the grid kept after filtering. Once found, the determining comprises calculating the 3D offset vector from the starting position to the ground truth camera position, considering that the offset vector has a based elevation of H (e.g., H=1700 mm).

The x and y coordinates (in the absolute system) of the offset vector are normalized by Sx and Sy respectively. The z coordinate is normalized by the room height and capped to the [−0,5;0,5] domain. In the case where the offset vector coordinates of x and y are not in the limited [−0,5;0,5] domain, the method may comprise applying to them the same proportional factor so that max (‖x‖, ‖y‖)=0.5.

The offline stage S110 comprises the training S113 of the first neural network (the position inference model). The first neural network may have an architecture including a graph neural network (GNN) model and a multilayer perceptron (MLP) model. The MLP model may take as input a concatenation of the output of the GNN model and coordinates of a starting position. Since the method uses a scene graph representation for the 3D room, the first neural network may be a graph neural network (GNN) model to obtain a meaningful embedding for each of the 3D rooms. This embedding is then concatenated with the starting position coordinates and fed into a multilayer perceptron model (MLP). The output of the multilayer perceptron (MLP) comprises the three coordinates of the offset vector.

In this example, the method uses the PNAConv architecture. Referring to the list of prior art references provided hereinabove, the use of the PNAConv architecture may be performed (among the state of the art of the GNN architectures) according to the teaching of reference [5]. The method comprises creating a unique network to obtain scene graph embeddings based on the PNAConv block illustrated in FIG. 3.

Figure 3:
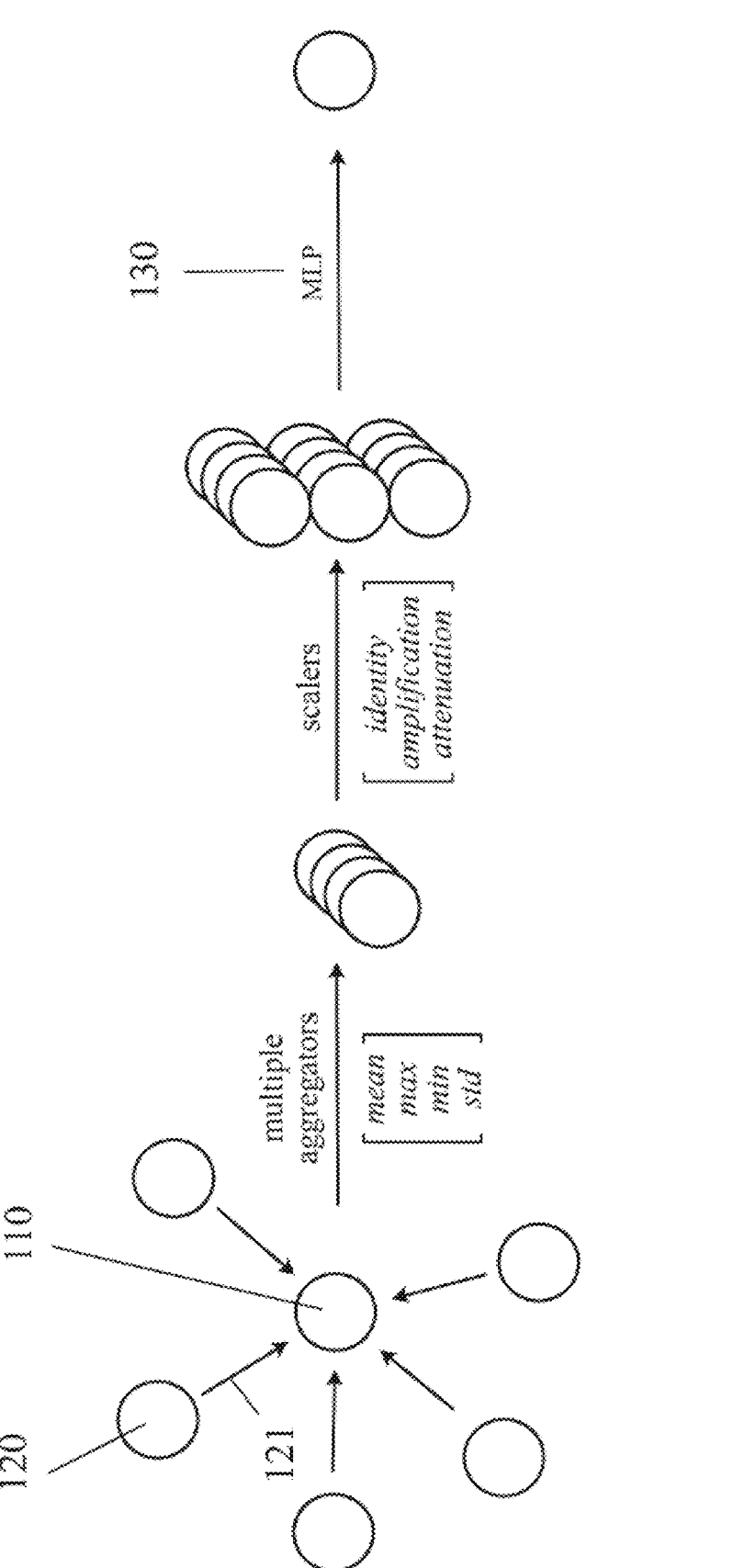
FIG. 3 illustrates an example of GNN model of the first
neural network.

The FIG. 3 illustrates the computation of a new node representation thanks to the PNAConv architecture. The node of interest is the node 110 and its neighbors (linked by an edge 121) are the nodes 120.

The architecture used is a combination of four PNAConv with a dimension of seven channels per node with a batch normalization layer and ReLU activation placed after each of them. The final graph representation is obtained by a global pooling (summation) on the node's features.

The MLP 130 has three linear layers with the following [input, output] dimensions for the three layers: [7+3, 5], [5+3, 3], [3+3, 3]. The +3 specified at each layer corresponds to the concatenation of the input position to the previous layer output and can be seen as a skip connection mechanism. ReLU activation is applied on each non final layer output. The activation function for the last output layer is f(x)=Sigmoid (x)−0.5 in order to match the target [−0.5; 0.5] domain.

This is an example implementation, and all the blocks may be tuned by changing the number and type of layers, the channels sizes, the activation layers, the pooling layers, etc. The main idea is to have a first neural network able to infer high level graph representation and a second one that infers a three-dimension vector representing the offset vector from this high-level representation and a three-dimension vector representing the input position.

The training loss may measure the difference between the predicted offset vector and the ground truth offset vector. Many different losses may be used such as the well-known L1 or L2 loss. The L1 loss is used in this example of implementation.

After this step, the method obtains the trained position inference model.

The offline stage S110 comprises the training S113 of the second neural network (the orientation inference model). The second neural network may have an architecture including a graph neural network (GNN) model and a multilayer perceptron (MLP) model. The MLP model may take as input a concatenation of the output of the GNN model and coordinates of a camera position outputted by the first neural network. The orientation inference network also uses the scene graph representation of the 3D room. The architecture is then similar to the position inference model. A first GNN is used to obtain meaningful embeddings of the 3D room. This embedding is then concatenated with the 3 coordinates of the considered camera position and fed into a multilayer perceptron model (MLP). The output of the MLP is the 3 coordinates of the orientation vector. During the training, the considered camera position taken as input by the second neural network for its orientation prediction is the ground truth position. During the inference phase, the second neural network takes as input a predicted position obtained from the prediction of the first neural network.

The architecture used is a combination of four PNAConv with a dimension of seven channels per node with a batch normalization layer and ReLU activation placed after each of them. The final graph representation is obtained by a global pooling (summation) on the node's features.

The MLP has two linear layers with the following [input, output] dimensions: [7+3, 5], [5, 3]. The +3 specified at the first layer corresponds to the concatenation of the input position to the previous layer output. ReLU activation is applied on the output of the first layer.

As for the first neural network, this is an example implementation and all the blocks may be tuned by changing the number and type of layers, the channels sizes, the activation layers, the pooling layers, etc. The main idea is to have a first neural network able to infer high level graph representation and a second one that infer a three-dimension vector representing the orientation vector from this high-level representation and a three-dimension vector representing the input position.

The training loss may measure the difference between the predicted orientation vector and the ground truth orientation vector. Many different losses may be used such as the cosine or L2 loss. The cosine loss may be used in this example of implementation.

After this step, the method obtains the trained orientation inference model.

The online stage S120 is now discussed.

Given a 3D Room, the online stage S120 comprises a first step S121. The first step S121 comprises first extracting its graph representation (e.g., this step may be performed as explained above during the offline stage). Then, the first step S121 comprises computing a set of starting (input) positions (e.g., this step may also be performed as explained above during the offline stage).

Then, the online stage S120 comprises the inference step S122. For the given 3D scene, the online stage S120 comprises determining a set of camera viewpoints by applying the first neural network and the second neural network to each starting position of a set of starting positions regularly distributed on a floor plan of the input 3D scene. The first neural network is applied first. The inference step S122 comprises using the trained position inference model (first neural network) to infer, for each starting position of the computed set, a final position that is obtained by adding the inferred offset vector for the starting position to the starting position, thereby obtaining a set of inferred final positions.

Then, the second neural network is applied. For each final position of the obtained set of inferred final positions, the inference step S122 inferring an orientation vector (camera orientation) by applying the trained orientation inference model (second neural network) to the final position, thereby obtaining a set of camera viewpoints (each camera viewpoints consisting in the final position and the orientation vector). The method obtains this set of camera viewpoints by applying the first neural network and the second neural network to each starting position of a set of starting positions regularly distributed on a floor plan of the input 3D scene.

Even if the results obtained at the previous step may already be used to define virtual visits, the online step may comprise a postprocessing step to avoid too much redundancy in the proposed viewpoints. This postprocessing step may be useful, especially when the number of starting positions is quite high (e.g., higher than 5), in order to improve the user experience (e.g., avoid too much redundancy in the proposed viewpoints). Optionally, the machine learning function may thus comprise a post-processing block. The post-processing block may be configured for selecting the outputted one or more camera viewpoints among the set of camera viewpoints determined by applying the first neural network and the second neural network to each starting position of a set of starting positions regularly distributed on a floor plan of the input 3D scene.

The selecting of the outputted one or more camera viewpoints may be performed so as to optimize the number of objects visible in the camera viewpoints. For example, the selecting may comprise determining, for each camera viewpoint, the 3D objects of the input 3D scene which are visible in a 2D rendering generated from the camera viewpoint. Then, the selecting may comprise selecting one or more of the determined camera viewpoints so that the 3D objects which are visible in the one or more 2D renderings generated from the one or more selected camera viewpoints represent at least a predetermined percentage of all the 3D objects which are present in the 3D scene. The visibility of an object in a 2D rendering may refer to the visibility of a vertex or face of the bounding box of the object in the 2D rendering. Alternatively, an object may be visible in a 2D rendering when at least one of the following criteria is met:

- a proportion of pixels in the 2D rendering (the image) corresponding to the object is greater than a threshold (e.g., 1% of the number of pixels in the 2D rendering); and/or
- a proportion of the faces of the object that are visible from the viewpoint is greater than a threshold (e.g., 10%).

In order to select a minimal number of predicted viewpoints for a given 3D room, the function may include a postprocessing step that aims at selecting the minimal number of viewpoints that present the best coverage that may be obtained from the set of inferred viewpoints. The definition of coverage is discussed in the following. The postprocessing step may be performed by executing the following example algorithm to select the inferred viewpoints. In a first step, the algorithm may comprise instructions for storing the set of objects that are seen for each viewpoint and for storing the list of objects seen by all the viewpoints together (e.g., in a database). Then, the algorithm may comprise instructions for sorting the list of viewpoints in a descending order with respect to the number of objects seen for each viewpoint. Then, the algorithm may comprise instructions for adding to the list of selected viewpoints the first element of the list and for removing it from the list of viewpoints that are now named the remaining viewpoints. Then, the algorithm may comprise instructions for, while the number of objects seen in the list of selected viewpoints is inferior to a certain percent of the list of objects seen by all the viewpoints (computed in the first step), doing the following steps: going through all the list of remaining viewpoints and selecting the one that contains the largest number of unseen objects with respect to the list of objects visible from the set of selected viewpoints, and, adding it to the list of selected viewpoints and removing it from the list of remaining viewpoints.

Examples of results of the machine learning function are now discussed.

The results are analyzed using the following metrics: a first metric named the relative coverage and a second one named the total coverage. The relative coverage is the ratio between the number of objects visible from the selected inferred viewpoints and the total number of objects visible from the inferred viewpoints. The total coverage is the ratio between the number of objects visible from the selected inferred viewpoints and the total number of objects in the scene. The results show the efficiency of the method.

Figure 4:
Figure 6:

The network was trained on around 50 k 3D bedrooms and, as a generalization proof, has been evaluated on 200 living rooms to obtain the following results. The results prove that the machine learning function is relevant to automatically infer viewpoints of any given 3D room. In particular, the machine learning function offers the possibility to infer a minimal number of viewpoints to observe the main furniture of the room (postprocessing step). The average number of objects per scene is 72.16. The mean number of selected renderings is 2.07. The mean relative coverage is 0.95. The mean total coverage is 0.74. FIGS. 4 to 8 show 2D renderings obtained from camera viewpoints inferred by the function (inference step). These results have been obtained for different room types for the model trained on the 50 k 3D bedrooms. In particular, FIG. 4 shows a first living room used in this first example, and FIG. 5 three 2D renderings obtained from three camera viewpoints inferred by the function for this first living room. FIG. 6 shows a bedroom used in this second example, and FIG. 7 three 2D renderings obtained from three camera viewpoints inferred by the function for this bedroom. FIG. 8 shows a second living room used in this second example, and two 2D renderings obtained from two camera viewpoints inferred by the function for this second living room.

The first dataset and/or the second dataset may have the following characteristics. The first dataset and/or the second data may comprise training samples of 3D scenes having a mean area higher than 10 m² and/or lower than 50 m² (e.g., a mean area of 16.7 m²). The first dataset and/or the second data may comprise training samples of 3D scenes having a mean number of objects per scene higher than 10 and/or lower than 50 (e.g., a mean number of objects per scene of 32.2). The first dataset and/or the second data may comprise training samples of 3D scenes having a mean total coverage higher than 0.25 and/or lower than 0.75 (e.g., of 0.51). Optionally, the camera position may be bounded in height (e.g., 2 m) and may be always in the room boundaries. For example, the method may comprise filtering 3D scenes with camera positions that do not respect those criteria from the library.

Figure 9:
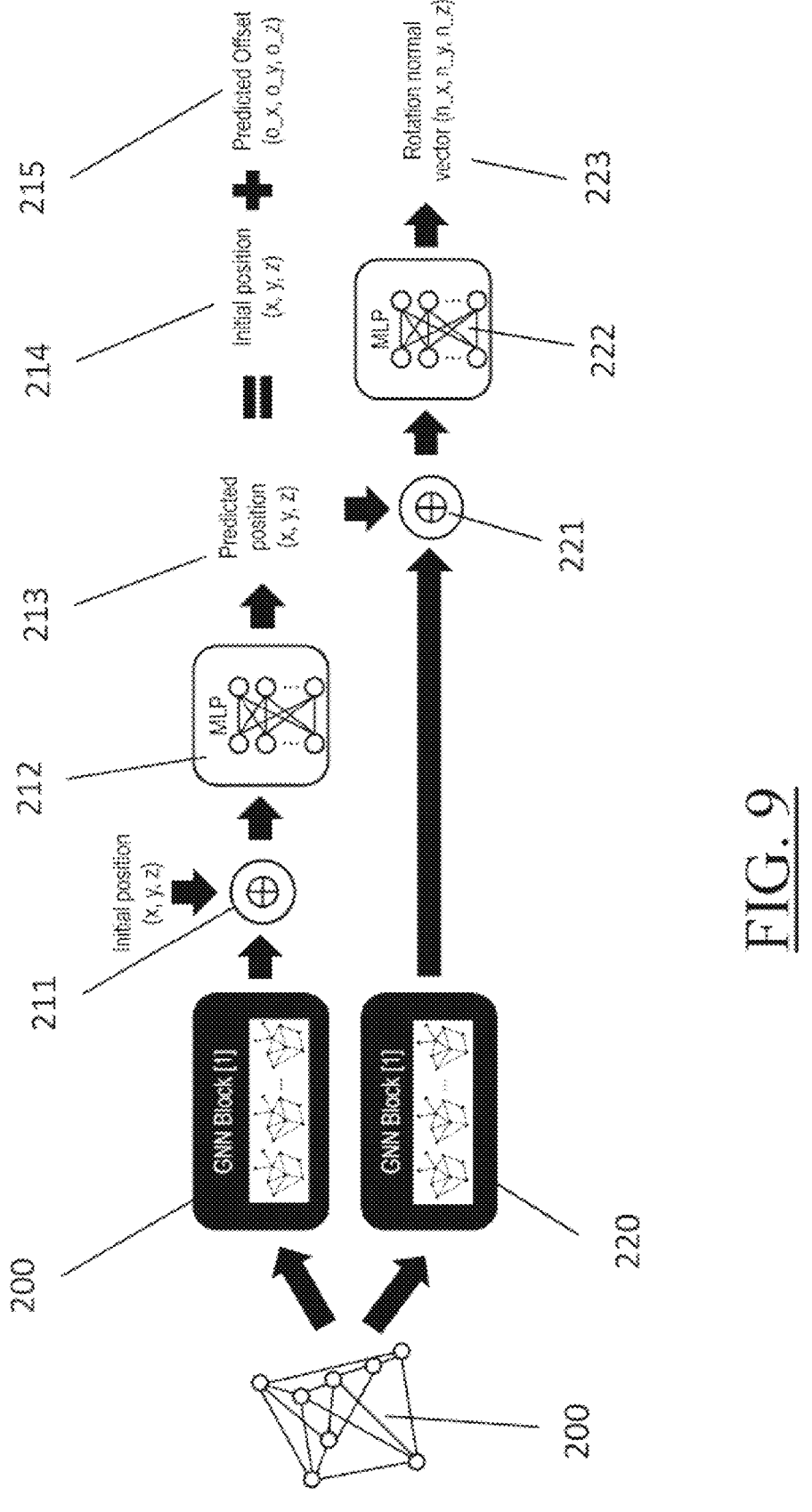
FIGS. 9 and 10 illustrate examples of architecture of
machine learning function.

FIG. 9 illustrates an example of architecture of machine learning function. The machine learning function comprises the first neural network (position model) and the second neural network (rotation model). The first neural network has an architecture including a graph neural network (GNN) model 210 and a multilayer perceptron (MLP) model 212. The MLP model 212 takes as input a concatenation 211 of the output of the GNN model 210 and coordinates of a starting position. The MLP model 212 outputs an offset vector 215. The final position 213 is computed by adding the outputted offset vector 213 to the initially considered starting position 214. The first neural network takes as input the graph 200 of the room and an initial position and predicts the position 213 of the camera. It is trained using the L1 loss and tries to learn f(G, $pos_{init}$) so that $pos_{pred}=pos_{init}+f(G, pos_{init})$.

The second neural network has an architecture including a graph neural network (GNN) model 220 and a multilayer perceptron (MLP) model 222. The MLP model 222 takes as input a concatenation 221 of the output of the GNN model 220 and coordinates of the camera position outputted by the first neural network (i.e., the final position 213, which is the result of the addition of the offset vector 213 outputted by the first neural network and the initial starting position 214). The second neural network 220 takes as input the graph and a position to predict the rotation for the camera. It is trained using the cosine distance (1−cosine similarity) and tries to learn h(G, pos) so that $rot_{pred}=h(G, pos)$.

Figure 10:
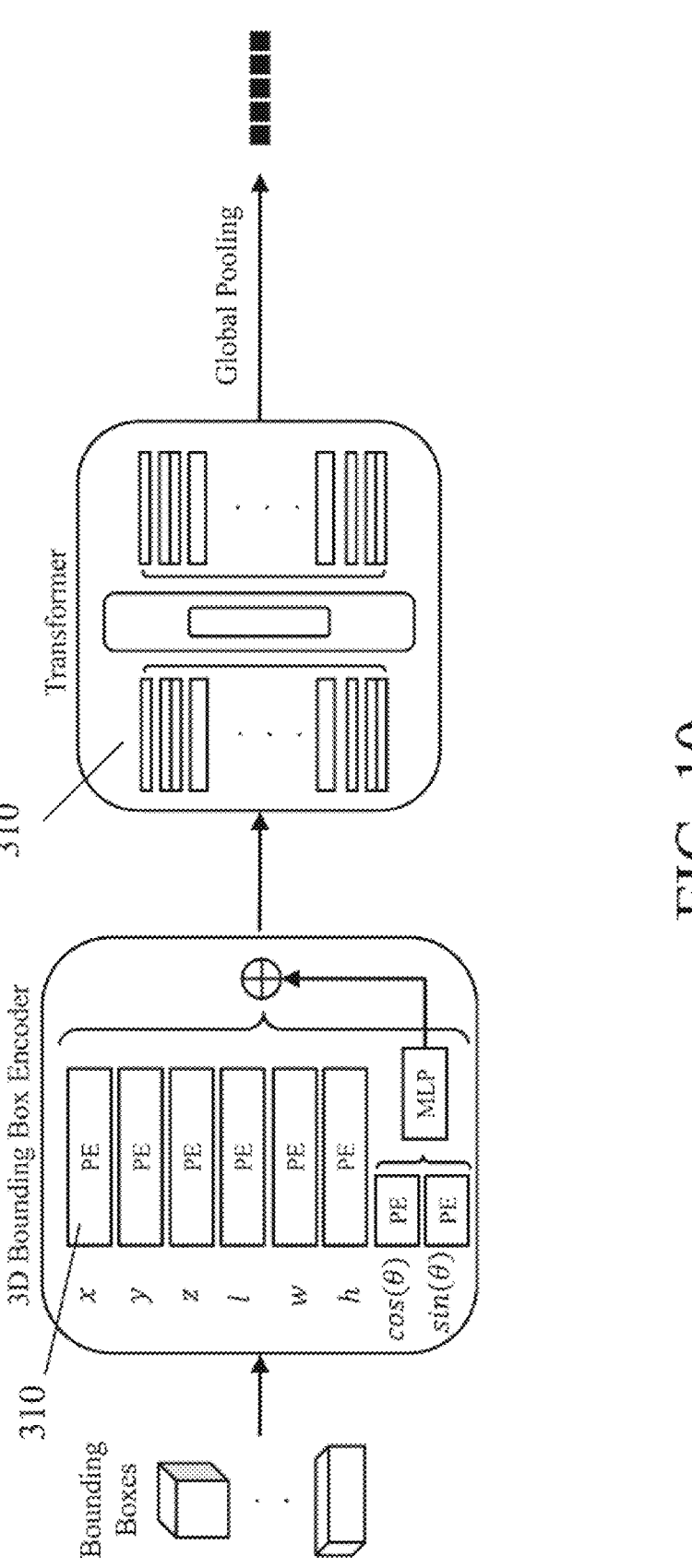

FIG. 10 illustrates an alternative example of architecture of the function. In this alternative, an alternative scene representation is used. Instead of a graph, the alternative scene representation is an unordered set of 3D_Elem (i.e., objects bounding boxes and positions). For example, each 3D_Elem may be represented by:

its 3D bounding box (length, width and height); and its transformation matrix (to obtain the absolute position and orientation in the 3D room of the 3D_Elem).

Therefore, the neural network may be based on a transformer architecture instead of a GNN to obtain the scene representation concatenated with the positions for both the position inference model and the orientation inference model. FIG. 10 illustrates such a transformer.

In the figure, PE 310 is a positional encoding used to project each scalar into a higher dimension space. Referring to the list of prior art references provided hereinabove, this positional encoding may be performed according to the teaching of reference [6]. x,y,z represent the position of the center of the bounding box, l,w,h, its size and θ the rotation around the z axis. The transformer may be implemented as in pytorch.org/docs/stable/modules/torch/nn/modules/transformer.html #Transformer (this may be performed according to the teaching of reference [7]).

Figure 11:
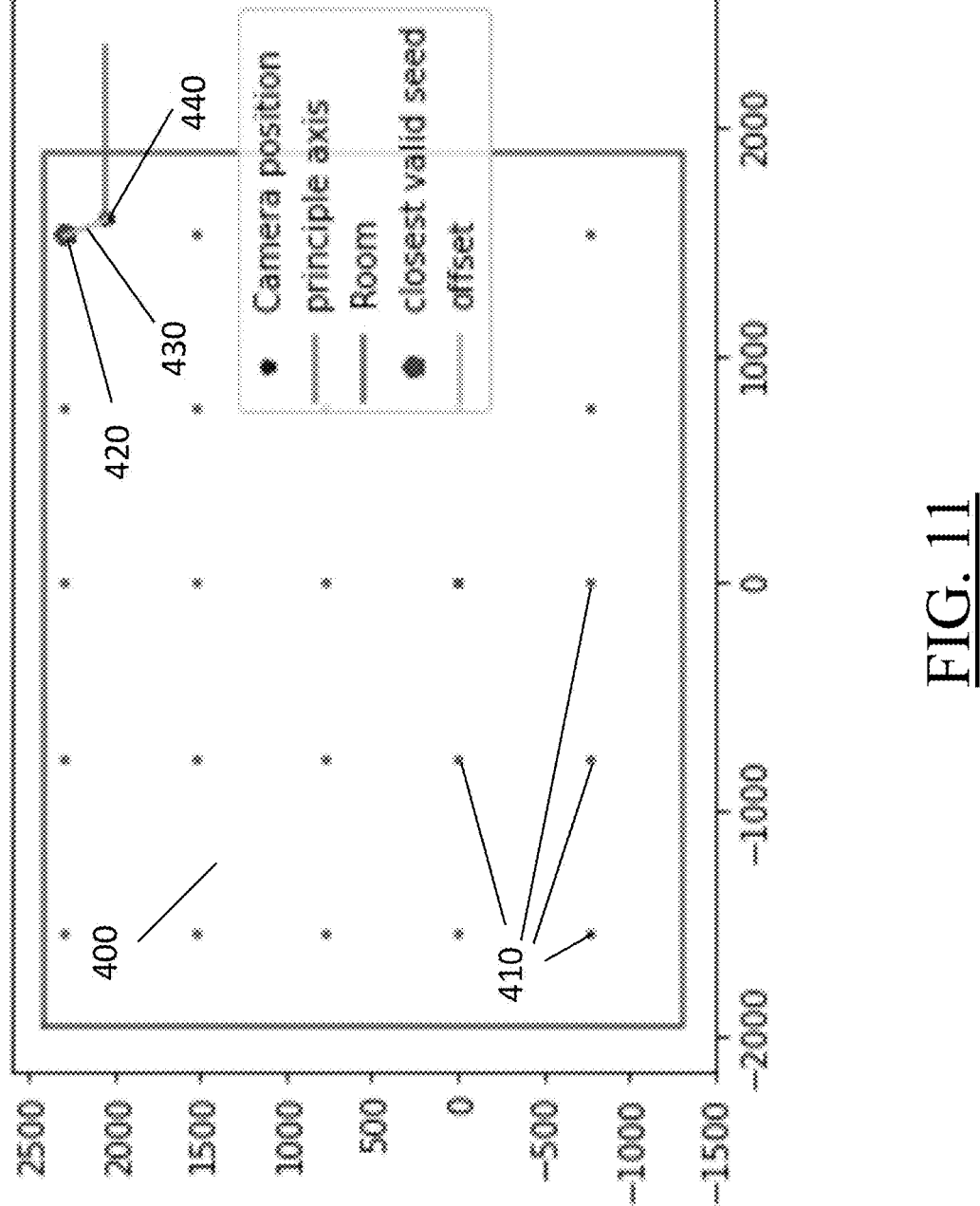
FIG. 11 shows an example of the set of starting positions.

FIG. 11 shows an example of the set of starting positions 410, 420. The set of starting positions 410, 420 is regularly distributed on the floor plan 400 of a 3D scene taken as input by the first neural network. The starting positions 410, 420 of the set are substantially equidistant from each other. The first neural network is configured to, for each starting position, take as input the input representation of the 3D scene and the starting position in the 3D scene and output an offset vector between a camera position and the starting position. For example, for the starting position 420, the first neural network is configured to take as input the input representation of the 3D scene and the starting position 420 and to output the offset vector 430 between the camera position 440 and the starting position 420. The method may deduce the camera position 440 inferred by the first neural network for the starting position 420 by adding the outputted offset vector 430 to the starting position 420 taken as input.

Figure 12:
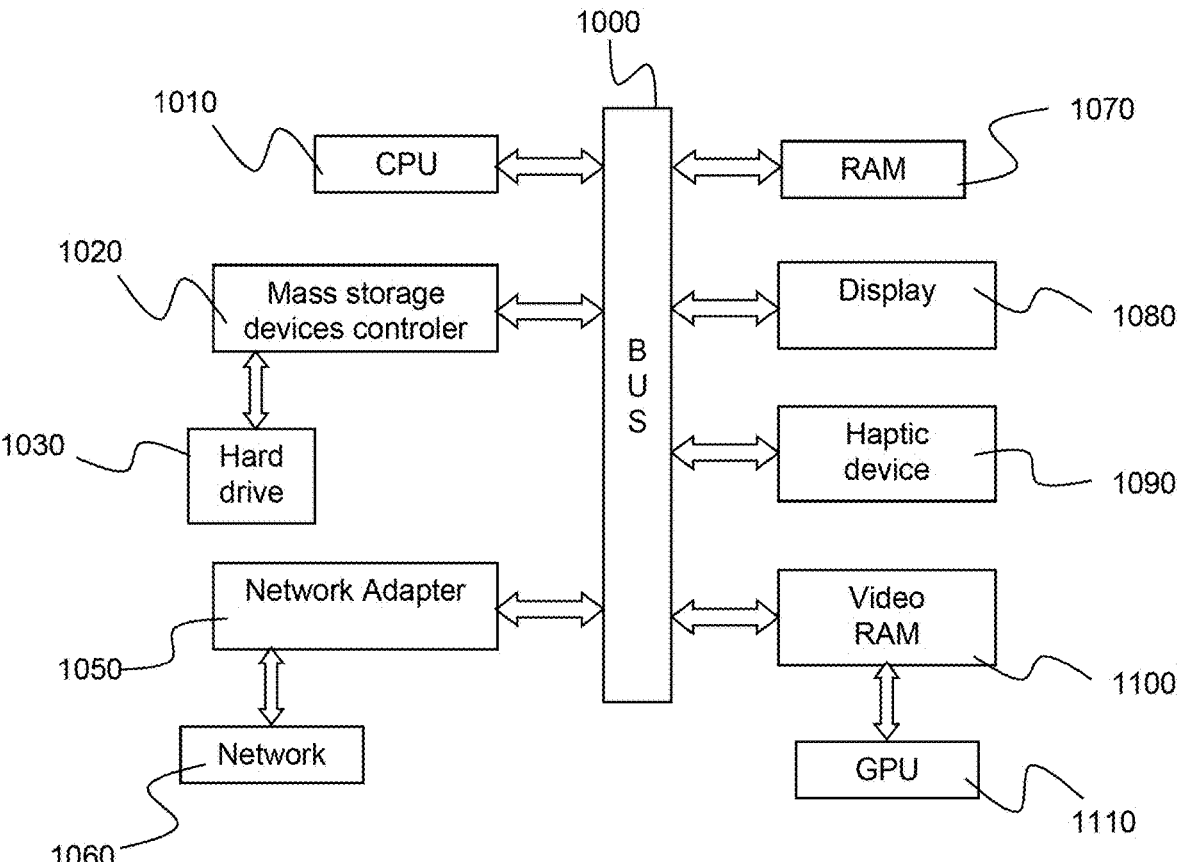
FIG. 12 shows an example of the system.

FIG. 12 shows an example of the system, wherein the system is a client computer system, e.g., a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method. The computer program may alternatively be stored and executed on a server of a cloud computing environment, the server being in communication across a network with one or more clients. In such a case a processing unit executes the instructions comprised by the program, thereby causing the method to be performed on the cloud computing environment.

The invention claimed is:

1. A computer-implemented method for determining a machine-learning function configured for taking an input 3D scene and for outputting one or more camera viewpoints each for generating a respective 2D rendering of the 3D scene, the method comprising:

obtaining a library having 3D scenes and, for each 3D scene, one or more camera viewpoints each for generating a respective 2D rendering of the 3D scene;

based on the library:

forming a first dataset for training a first neural network configured for taking a first input representation of a 3D scene and for outputting information corresponding to a camera position in the 3D scene, the library including optimal camera viewpoints for each 3D scene, a respective camera viewpoint being optimal when a large number of objects are visible from the respective camera viewpoint relative to the total number of objects in the scene, and forming a second dataset for training a second neural network configured for taking a second input representation of the 3D scene and a camera position outputted by the first neural network and for outputting information corresponding to a camera orientation in the 3D scene; and training the first neural network based on the first dataset and training the second neural network based on the second dataset, and determining the machine-learning function comprising the trained first neural network and the trained second neural network, each camera viewpoint outputted by the machine-learning function having a camera position corresponding to information outputted by the trained first neural network and a camera orientation corresponding to information outputted by the trained second neural network.

2. The computer-implemented method of claim 1, wherein the forming of the first dataset further comprises, for each 3D scene:

determining a set of starting positions regularly distributed on a floor plan of the 3D scene; and for each camera viewpoint of the 3D scene, determining an offset vector between the camera position of the camera viewpoint and the closest starting position, the first neural network being configured to further take as input a starting position in the 3D scene, the information outputted by the first neural network having an offset vector between a camera position and the starting position.

3. The computer-implemented method of claim 2, wherein the starting positions of each set are substantially equidistant from each other, a distance between the starting positions being substantially the same for each 3D scene.

4. The computer-implemented method of claim 2, wherein the starting positions of each set are distributed to form a regular 2D grid on the floor plan of the 3D scene, each starting position corresponding to a respective vertex of the regular 2D grid.

5. The computer-implemented method of claim 1, wherein the first input representation and/or the second input representation includes a set of geometrical characteristics of 3D objects of the 3D scene.

6. The computer-implemented method of claim 5, wherein the geometrical characteristics include positioning, orientation and/or dimensional information, optionally bounding boxes each representing a respective 3D object of the 3D scene.

7. The computer-implemented method of claim 5, wherein the first input representation and/or the second input representation includes a graph having nodes each representing a respective object of the 3D scene and arcs each linking a respective pair of nodes, the 3D objects represented by the nodes of a pair being arranged according to a mutual arrangement relationship from a predetermined set of one or more mutual arrangement relationships.

8. The computer-implemented method of claim 7, wherein the predetermined set of one or more mutual arrangement relationships includes an adjacency relationship, a proximal relationship, a distance relationship and/or a vertical superposition relationship.

9. The computer-implemented method of claim 1, wherein the first neural network has an architecture including a graph neural network (GNN) model and a multilayer perceptron (MLP) model, the MLP model taking as input a concatenation of the output of the GNN model and coordinates of a starting position, and/or wherein the second neural network has an architecture including a graph neural network (GNN) model and a multilayer perceptron (MLP) model, the MLP model taking as input a concatenation of the output of the GNN model and coordinates of a camera position outputted by the first neural network.

10. The computer-implemented method of claim 1, wherein the machine learning function includes a post-processing block, the post-processing block being configured for selecting the outputted one or more camera viewpoints among a set of camera viewpoints determined by applying the trained first neural network and the trained second neural network to each starting position of a set of starting positions regularly distributed on a floor plan of the input 3D scene.

11. The computer-implemented method of claim 10, wherein the selecting of the outputted one or more camera viewpoints further comprises:

determining, for each camera viewpoint, 3D objects of the input 3D scene which are visible in a 2D rendering generated from the camera viewpoint; and selecting one or more of the determined camera viewpoints so that the 3D objects which are visible in the one or more 2D renderings generated from the one or more selected camera viewpoints represent at least a predetermined percentage of all the 3D objects which are present in the 3D scene.

12. A non-transitory computer readable storage medium having recorded thereon a computer program having instructions which, when executed by a computer, cause the computer to implement a method for determining a machine-learning function configured for taking an input 3D scene and for outputting one or more camera viewpoints each for generating a respective 2D rendering of the 3D scene, the method comprising:

obtaining a library having 3D scenes and, for each 3D scene, one or more camera viewpoints each for generating a respective 2D rendering of the 3D scene;

based on the library:

forming a first dataset for training a first neural network configured for taking a first input representation of a 3D scene and for outputting information corresponding to a camera position in the 3D scene, the library including optimal camera viewpoints for each 3D scene, a respective camera viewpoint being optimal when a large number of objects are visible from the respective camera viewpoint relative to the total number of objects in the scene, and forming a second dataset for training a second neural network configured for taking a second input representation of the 3D scene and a camera position outputted by the first neural network and for outputting information corresponding to a camera orientation in the 3D scene; and training the first neural network based on the first dataset and training the second neural network based on the second dataset, and determining the machine-learning function comprising the trained first neural network and the trained second neural network, each camera viewpoint outputted by the machine-learning function having a camera position corresponding to information outputted by the trained first neural network and a camera orientation corresponding to information outputted by the trained second neural network.

13. The non-transitory computer readable storage medium of claim 12, wherein the forming of the first dataset further comprises, for each 3D scene:

determining a set of starting positions regularly distributed on a floor plan of the 3D scene; and for each camera viewpoint of the 3D scene, determining an offset vector between the camera position of the camera viewpoint and the closest starting position, the first neural network being configured to further take as input a starting position in the 3D scene, the information outputted by the first neural network having an offset vector between a camera position and the starting position.

14. The non-transitory computer readable storage medium of claim 13, wherein the starting positions of each set are substantially equidistant from each other, a distance between the starting positions being substantially the same for each 3D scene.

15. The non-transitory computer readable storage medium of claim 13, wherein the starting positions of each set are distributed to form a regular 2D grid on the floor plan of the 3D scene, each starting position corresponding to a respective vertex of the regular 2D grid.

16. A system comprising:

a processor coupled to a memory, the memory having recorded thereon a computer program for determining a machine-learning function configured for taking an input 3D scene and for outputting one or more camera viewpoints each for generating a respective 2D rendering of the 3D scene that when executed by the processor causes the processor to be configured to:

obtain a library having 3D scenes and, for each 3D scene, one or more camera viewpoints each for generating a respective 2D rendering of the 3D scene;

based on the library:

form a first dataset for training a first neural network configured for taking a first input representation of a 3D scene and for outputting information corresponding to a camera position in the 3D scene, the library including optimal camera viewpoints for each 3D scene, a respective camera viewpoint being optimal when a large number of objects are visible from the respective camera viewpoint relative to the total number of objects in the scene, and form a second dataset for training a second neural network configured for taking a second input representation of the 3D scene and a camera position outputted by the first neural network and for outputting information corresponding to a camera orientation in the 3D scene; and train the first neural network based on the first dataset and training the second neural network based on the second dataset, and determine the machine-learning function comprising the trained first neural network and the trained second neural network, each camera viewpoint outputted by the machine-learning function having a camera position corresponding to information outputted by the trained first neural network and a camera orientation corresponding to information outputted by the trained second neural network.

17. The system of claim 16, wherein the processor is further configured to form the first dataset by being configured to, for each 3D scene:

determine a set of starting positions regularly distributed on a floor plan of the 3D scene; and for each camera viewpoint of the 3D scene, determine an offset vector between the camera position of the camera viewpoint and the closest starting position, the first neural network being configured to further take as input a starting position in the 3D scene, the information outputted by the first neural network having an offset vector between a camera position and the starting position.

18. The system of claim 17, wherein the starting positions of each set are substantially equidistant from each other, a distance between the starting positions being substantially the same for each 3D scene.

19. The system of claim 17, wherein the starting positions of each set are distributed to form a regular 2D grid on the floor plan of the 3D scene, each starting position corresponding to a respective vertex of the regular 2D grid.

* * * * *